US009850841B2

(12) United States Patent
Knudsen et al.

(10) Patent No.: US 9,850,841 B2
(45) Date of Patent: Dec. 26, 2017

(54) SYSTEM AND PROGRAM PRODUCT FOR CONTROLLING EXHAUST GAS TEMPERATURE OF ENGINE SYSTEM

(71) Applicant: General Electric Company, Schenectady, NY (US)

(72) Inventors: Julian R. Knudsen, Waukesha, WI (US); Troy Christopher Gosselin, Kenosha, WI (US); Yupeng Xiong, Milwaukee, WI (US); James Kristopher von der Ehe, Delafield, WI (US)

(73) Assignee: General Electric Company, Schenectady, NY (US)

( * ) Notice: Subject to any disclaimer, the term of this patent is extended or adjusted under 35 U.S.C. 154(b) by 1050 days.

(21) Appl. No.: 14/102,615

(22) Filed: Dec. 11, 2013

(65) Prior Publication Data

US 2015/0159572 A1    Jun. 11, 2015

(51) Int. Cl.
  *F02D 41/14* (2006.01)
  *F02D 41/02* (2006.01)
  *F02D 41/00* (2006.01)

(52) U.S. Cl.
  CPC ..... *F02D 41/1446* (2013.01); *F02D 41/0007* (2013.01); *F02D 41/0205* (2013.01); *F02D 2200/101* (2013.01); *Y02T 10/144* (2013.01)

(58) Field of Classification Search
  CPC ........... F02D 2200/101; F02D 41/0007; F02D 41/0205; F02D 41/1446; F02D 2200/021; Y02T 10/144

(Continued)

(56) References Cited

U.S. PATENT DOCUMENTS 4,571,945 A    2/1986  Inada et al.
6,925,985 B2 *  8/2005  Wagner ................. F02D 31/001
                                                                 123/198 DB (Continued)

FOREIGN PATENT DOCUMENTS

DE    102005016392 B3    9/2006
WO    2006108580 A1      10/2006
WO    2012150879 A1      11/2012

OTHER PUBLICATIONS

English Machine translation of WO 2006/108580 A1 (translated from Espacenet on May 20, 2017).*

(Continued)

*Primary Examiner* — Mark Laurenzi
*Assistant Examiner* — Paul Thiede
(74) *Attorney, Agent, or Firm* — Ernest G. Cusick; Hoffman Warnick LLC

(57) ABSTRACT

Aspects of the disclosure include a system for controlling an exhaust gas communicated from an engine system to a turbine component of a turbocharger system. The system can include an engine having an operational speed; a turbocharger system including a turbine component, the exhaust gas being output from the engine in an exhaust line; a controller in communication with the engine; and a sensor disposed in the exhaust line being in communication with the controller, the system operating according to the following method: measuring the first temperature of the exhaust gas, determining if the measured first temperature of the exhaust gas is within a temperature safety window of the system; calculating an engine speed of the engine; and adjusting an engine speed setpoint and speed of the engine based on the measured first temperature and the calculated engine speed.

19 Claims, 5 Drawing Sheets

(58) Field of Classification Search
USPC .................................................. 60/603, 605.1
See application file for complete search history.

(56) References Cited

U.S. PATENT DOCUMENTS

| | | | |
|---|---|---|---|
| 8,555,614 B2 | 10/2013 | Sato | |
| 8,572,961 B2 | 11/2013 | Karmic et al. | |
| 8,587,051 B2 | 11/2013 | Takasu | |
| 2011/0099997 A1 | 5/2011 | Singh et al. | |
| 2012/0203446 A1 | 8/2012 | Otsuka | |
| 2012/0279216 A1 | 11/2012 | Otsuka | |
| 2013/0003778 A1* | 1/2013 | Tugnolo | F01N 11/005 374/45 |
| 2013/0139504 A1* | 6/2013 | Barasa | F02D 41/0245 60/605.1 |
| 2013/0276764 A1* | 10/2013 | Nemeth | F04B 41/06 123/564 |
| 2013/0291816 A1* | 11/2013 | Serrano | F01L 1/344 123/90.17 |

OTHER PUBLICATIONS

A European Search Report and Opinion issued in connection with corresponding EP Application No. 14197241.4 dated Apr. 28, 2015.

* cited by examiner

SYSTEM AND PROGRAM PRODUCT FOR CONTROLLING EXHAUST GAS TEMPERATURE OF ENGINE SYSTEM

BACKGROUND OF THE INVENTION

1. Technical Field

The disclosure relates generally to systems which control the exhaust gas temperature of an engine system. More particularly, the disclosure is related to a system and program product for controlling the temperature of exhaust gas delivered from an engine system to a turbine component of a turbocharger system.

2. Related Art

Engines, e.g., internal combustion engines, can generate mechanical energy by combusting a source of fuel, thereby creating mechanical power used to drive a load component attached to the internal combustion engine. To improve the efficiency of combustion reactions, engine systems can include a "turbocharger system," which compresses feed or "inlet" air before it is introduced to the internal combustion engine. The compressor of the turbocharger can be mechanically linked to a turbine component through a rotatable shaft. The turbine component of the turbocharger can be actuated with exhaust gas from the internal combustion engine to rotate the shaft, thereby powering the compressor component.

The performance of an engine system and a turbocharger system may be dependent, at least in part, on the internal temperature of each system and the temperature of the air being directed therethrough. In addition, the performance of auxiliary components and systems may be affected by the temperature of the exhaust gas leaving the engine and/or entering the turbocharger. As the exhaust gas temperature increases, the risk of undesirable side effects on the turbocharger may also increase. Over time, components of the engine and turbocharger systems may experience creep effects due to sustaining the higher exhaust gas temperatures, as well as scaling of the material and wear of the bearing systems in the turbocharger. One solution to this problem is to reduce the exhaust gas temperature by reducing the load on the engine system. However, adjusting the load on an internal combustion engine that drives a gas compressor frequently requires adjusting of the components of the compressor coupled to the engine. Adjusting the pockets of a compressor is typically a costly, manual process.

BRIEF DESCRIPTION OF THE INVENTION

A system and program product for controlling the exhaust gas temperature of an engine system are disclosed. Although embodiments of the disclosure are discussed by example herein relative to engine systems with turbocharger systems, it is understood that embodiments of the present disclosure may be applied to other situations.

A first aspect of the invention provides a system for controlling an exhaust gas communicated from an engine system to a turbine component of a turbocharger system, the system including: a sensor configured to determine a temperature of the exhaust gas; and a controller configured to adjust an engine system speed based on the temperature of the exhaust gas being greater than or less than a temperature safety window.

A second aspect of the invention provides a program product stored on a computer readable storage medium, the program product operative to control a temperature of an exhaust gas yielded from an engine system to a turbocharger system when executed, the computer readable storage medium comprising program code for: adjusting an engine speed setpoint of an engine control unit in response to a temperature of the exhaust gas being greater than or less than a temperature safety window; wherein the adjusting the engine speed setpoint corresponds to an engine system speed.

A third aspect of the invention provides a system comprising: an engine system; a turbocharger system in fluid communication with the engine system, the turbocharger system including: a turbine component configured to receive an exhaust gas from the engine system; a rotatable shaft coupled to the turbine component; a compressor component coupled to the rotatable shaft, wherein the compressor component is configured to deliver a compressed air stream to the engine system; a sensor configured to determine a temperature of the exhaust gas communicated from the engine system to the turbine component of the turbocharger system; and a controller configured to adjust an engine system speed based on the temperature of the exhaust gas being outside of a temperature safety window.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
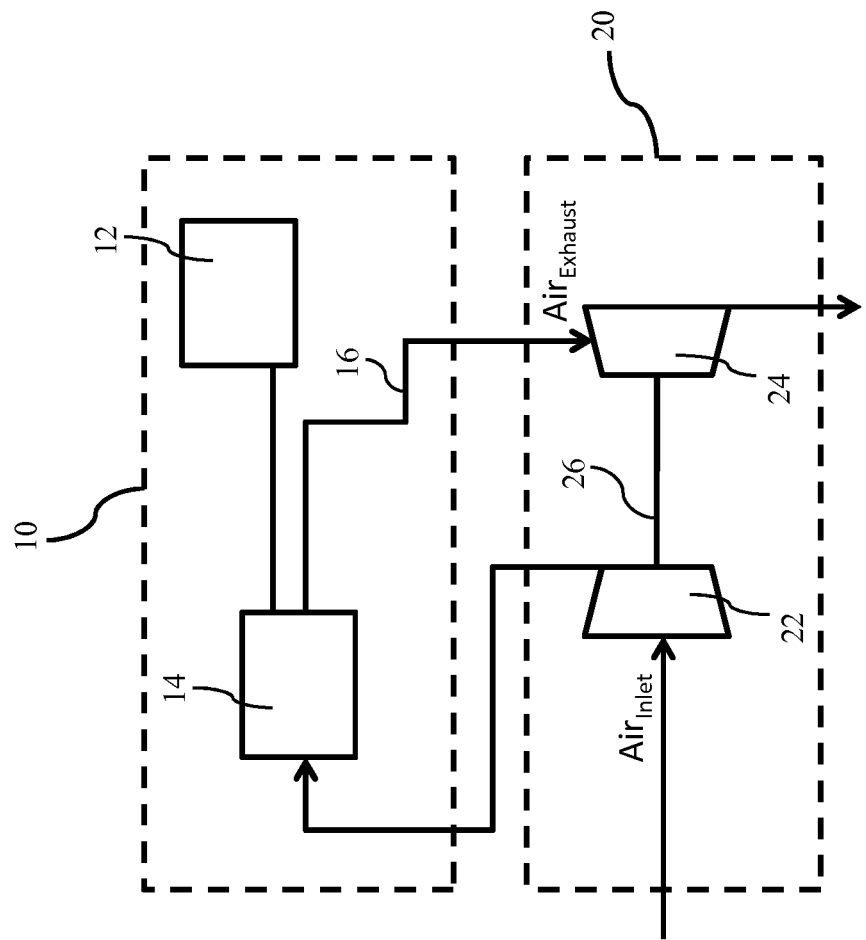
FIG. 1 shows a schematic depiction of a conventional engine system and a turbocharger system.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As discussed herein, aspects of the invention relate generally engine systems, such as internal combustion engines, and their interaction with a turbocharger system. More particularly, as discussed herein, aspects of the invention relate to a system and program product for controlling the temperature of exhaust gas yielded from an engine system and provided to a turbocharger system.

Turning to FIG. 1, a schematic depiction of an engine system 10 and turbocharger system 20, arranged in a conventional fashion, is shown. Engine system 10 may be any conventional engine assembly, now known or later developed, for delivering power to a load component 12 coupled thereto. A brief description of engine system 10 is provided for clarity. As shown in FIG. 1, engine system 10 may include an internal combustion engine 14 mechanically coupled to load component 12. Internal combustion engine 14 may also be in fluid communication with a fuel supply (not shown). Internal combustion engine 14 can combine fuel provided from the fuel supply with a stream of pressurized air, thereby causing a combustion reaction and yielding a stream of exhaust gas. The exhaust gas stream is delivered from internal combustion engine 14 via an exhaust gas line 16.

Turbocharger system 20 can obtain inlet air ($Air_{inlet}$) from an external source (not shown), which is pressurized in turbocharger system 20 and provided to engine system 10. Exhaust gas yielded from internal combustion engine 14 can return to turbocharger system 20 through exhaust gas line 16. As is known in the art, a "turbocharger" refers to a component which can pressurize air provided to an engine system, or other devices having a similar effect. Turbine system 20 can include a compressor component 22 and a turbine component 24, which may be coupled to each other with a rotatable shaft 26. Compressor component 22 of turbocharger system 20 can be powered completely or partially by exhaust gas ($Air_{Exhaust}$) yielded from engine system 10. Specifically, as described in further detail elsewhere herein, exhaust gas passing through turbine component 24 can actuate several turbine buckets 28 (FIG. 2) coupled to rotatable shaft 26. As rotatable shaft 26 rotates, mechanical power for driving compressor component 22 can be generated. Compressor component 22 of turbocharger system 20 can increase the pressure of inlet air, and deliver the compressed inlet air to engine system 10. Embodiments of the present disclosure can control the temperature of exhaust gas ($Air_{Exhaust}$) entering turbine component 24 of turbine system 22 to influence the amount of compression and resulting temperature of air provided to engine system 10 from turbocharger system 20.

Figure 2:
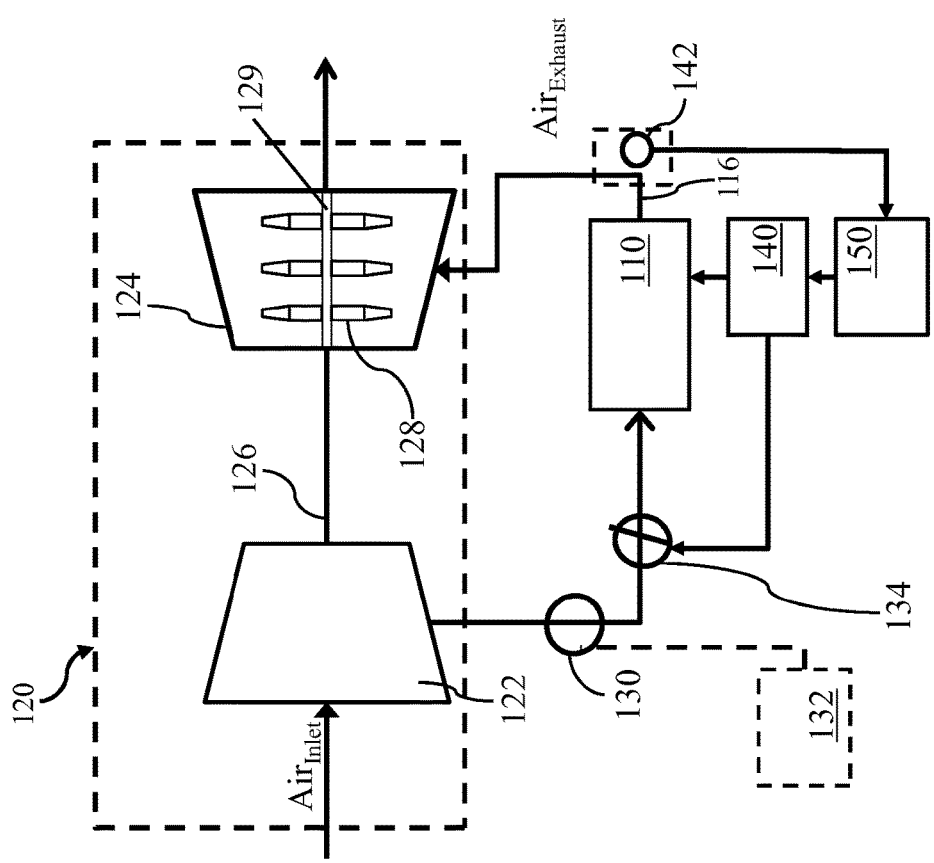
FIG. 2 shows a schematic depiction of an engine system, turbocharger system, and controller according to an embodiment of the present disclosure.

Turning to FIG. 2, an engine system 110 and turbocharger system 120 according to an embodiment of the present disclosure are shown. As described elsewhere herein, turbocharger system 120 can include compressor component 122 and turbine component 124, operatively coupled to each other through rotatable shaft 126. Rotatable shaft 126 of turbocharger system 120 can generate power for operating compressor component 122. Engine system 110 can receive a stream of compressed inlet air ($Air_{inlet}$) from compressor component 122, and react the compressed air stream with fuel to generate heat and energy according to any known or later developed combustion process. In an embodiment, engine system 110, including internal combustion engine 14 (FIG. 1) can include a reciprocating or "piston" engine composed of several combustion chambers, each of which periodically expand and contract as a piston actuates a crankshaft within the combustion chamber. The rate at which reactions occur within engine system 110 can be driven in part by the speed of various components within engine system 110. For example, in a reciprocating engine, the reaction speed can be driven in part by the rotational speed of a flywheel and crankshaft coupled thereto. As the speed of the flywheel and crankshaft increase, the speed of the various pistons within the reciprocating engine also increases. In a reciprocating engine, engine speed can be measured in terms of the rate at which the flywheel rotates, e.g., in revolutions per minute (rpm). Fuel can be introduced to engine system 110 in direct proportion to the amount of air provided from compressor 22 by use of a carburetor 130, which may be in positioned between, and in fluid communication with, a fuel supply 132 (shown in phantom) and engine system 110. A combustion chamber of engine system 110, including, e.g. a component of internal combustion engine 14 (FIG. 1), can react fuel from fuel supply 132 with compressed air to generate mechanical energy. A throttle 134 can be located along the line leading from compressor 22 to engine system 110. Throttle 134 can be in the form of a rotating component which controls the flow of air from compressor 22 into engine system 110. By controlling the rate at which air from compressor 22 is introduced to engine system 110, throttle 134 can be adjusted as described herein to influence the speed of engine system 110. The energy generated in engine system 110 from combustion reactions can be used to power mechanical components, while exhaust gas from the combustion can enter exhaust gas line 116 and return to turbocharger system 120.

Turbine component 124 of turbocharger system 120 can include several fixed blades 128. Blades 128 can be connected a turbine wheel component 129, which in turn can be connected to shaft 126. Blades 128 can turn as they are acted on by exhaust gas ($Air_{Exhaust}$) yielded from engine system 110. To direct the flow of exhaust gas through turbine component 124, several nozzles (not shown) can be positioned between each blade 128 and the housing of turbine component 124. In this manner, combustion reactions in engine 110 can cause shaft 126 to rotate and generate energy for powering compressor 122. To manage the speed of engine system 110, an engine control unit (ECU) 140 can be coupled between engine system 110 and a controller 150. If desired, ECU 140 can be physically mounted on or attached to the structure of engine system 110. It is further understood that controller 150 may be coupled to or part of an interface between a user and engine system 110. Controller 150 thus may be configured to control or set safety limits pertaining to the entirety of engine system 110, turbocharger system 120, and any load components coupled to the various systems described herein (e.g., a gas compressor system). ECU 140 can include any currently known or later developed device capable of translating an electrical or mechanical signal to a mechanical force, e.g., rotation, actuation, etc. Specifically, ECU 140 can be a controller component coupled to or forming a part of engine system 110. ECU 140 can be coupled electrically to a movable part within engine system 110 such as a piston, crankshaft, etc. to read various parameters of engine system 110, e.g., engine speed. In turn, controller 150 can be operatively connected (e.g., mechanically, electronically, etc.) to ECU 140 through components such as wires, networks, mechanical energy converters, etc. ECU 140 can thus adjust the speed of engine system 10, whether independently or as a result of instructions (e.g., signals) provided from controller 150. For example, ECU 140 can periodically adjust the speed of engine system 110 based on an environment-level and system-level factor changing over time, to hold engine system 110 within a stable operating state. In an embodiment, controller 150 can instruct ECU 140 to adjust the desired or stable operating state of engine system 110 in response to several performance variables for engine system 110 and/or turbocharger system 120. For example, controller 150 can instruct ECU 140 to reduce the speed of engine system 110 in response to the temperature of exhaust gas ($Air_{Exhaust}$) being greater than or less than a desired temperature safety window, as described in detail herein. Although controller 150 and ECU 140 are shown by example herein as two independent components, it is understood that controller 150 and ECU 140 can be part of a single component or control system if desired.

To measure performance variables (e.g., temperatures), one or more sensors 142 can be installed in an area of interest, e.g., between turbine component 124 of turbocharger system 120 and engine system 110. For example, sensor 142 may be positioned within exhaust line 116, within turbine component 124, or within other components of engine system 110 or turbocharger system 120. Although sensor 142 is shown by way of example as being a single unit, the present disclosure also contemplates several sensors 142 being located within engine system 110 and/or turbocharger system 120. In addition or alternatively, the temperature of exhaust gas can be computed, e.g., by computing a mean or other statistic numerically derived from a sample of data. Sensor 142 can be coupled to controller 150 by any currently known or later developed component capable of transmitting data between two components, e.g., a wire, a bus, a wireless network, etc. In an embodiment, sensor 142 can be in the form of a temperature sensor such as a digital thermometer. Sensor 142 can read the temperature of one or more components within engine system 110 and/or turbocharger system 120. For example, sensor 142 can detect the temperature of exhaust gas (Air-$_{Exhaust}$), sometimes known as the "turbine inlet temperature," in relation to turbine component 124, and provide the detected temperature to controller 150. Sensor 142 can also detect other performance variables, e.g., the pressure of air leaving compressor component 122, the speed of shaft 126, and other characteristics of engine system 110 or turbocharger system 120, if desired. For example, sensor 142 could be a pressure sensor such as a barometer, and controller 150 can mathematically derive the temperature of exhaust gas leaving engine system 110 from pressure values detected by sensor 142, and other quantities.

Figure 3:
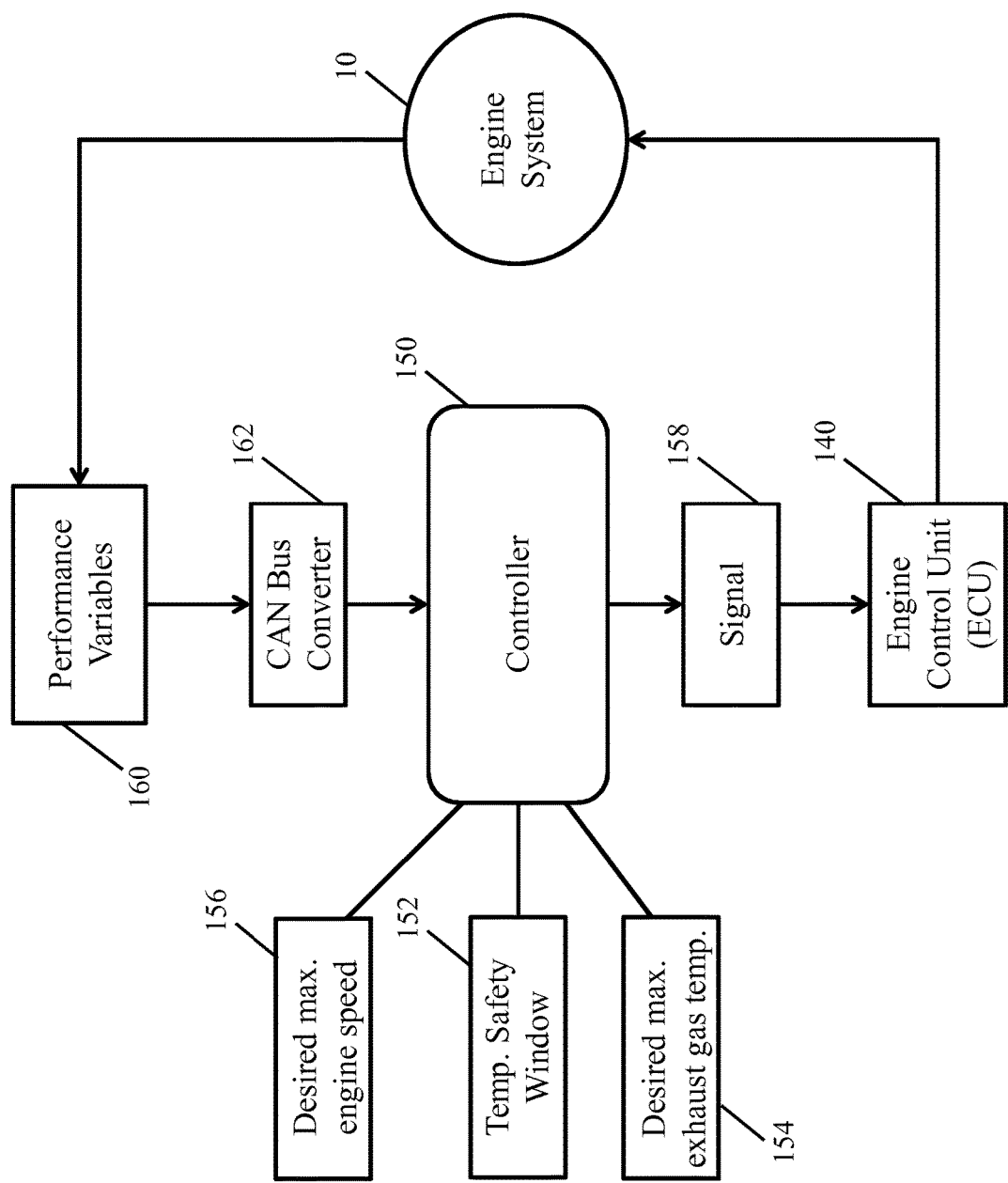
FIG. 3 shows a block diagram of a controller and an engine system according to an embodiment of the present disclosure.

Turning to FIG. 3, an example block diagram representing the interaction between controller 150 and engine system 110 is shown. A temperature safety window 152 can be stored or fixed within controller 150, for example, in memory. In addition or alternatively, other desired parameters, e.g., a desired maximum exhaust gas temperature 154 and a desired maximum engine speed 156 can also be stored or fixed within controller 150, for example, in memory. To adjust the speed of engine system 110, controller 150 can dispatch a signal 158 to ECU 140. Signal 158 may be, for example, an electrical signal having a magnitude of current between approximately 4.0 mA and 20 mA. As described elsewhere herein, ECU 140 may include, or otherwise be in the form of, any device capable of translating electrical signals into mechanical energy, an/or any control system capable of adjusting the speed of an engine such as engine system 110. For example, ECU 140 may be coupled to throttle 134 (FIG. 2), allowing ECU 140 to increase or decrease the amount of the air/fuel mixture provided to engine system 110 in order to affect the speed of engine system 110. An instruction encoded within signal 158 can cause ECU 140 to adjust the speed of engine system 110 based on a relationship between data received in controller 150 and a desired operating condition, such as temperature safety window 152. Although described by example herein as a "window," it is understood that temperature safety window 152 can alternatively be in the form of a maximum temperature value, a minimum temperature value, and/or a target temperature value. Temperature safety window 152 can also include upper and lower values derived from a tolerance range or other design specification. The speed of engine system 110 can increase, decrease, or remain the same as a result of being adjusted by ECU 140, thereby affecting various performance variables 160 of engine system 110 and/or turbocharger system 120 (FIGS. 1, 2). Performance variables 160 can include a temperature of exhaust gas leaving engine system 110 (FIGS. 1, 2) and/or the temperature of exhaust gas entering compressor component 124 (FIG. 2), an operating speed or temperature of turbocharger system 120 (FIG. 1), or other variables relating to the operating condition of engine system 110 or turbocharger system 120. Performance variables 160 can be measured, e.g., with sensors 142, and communicated to controller 150 through a bus, data line, etc. Specifically, a controller area network (CAN) bus converter 162 can communicate performance variables 160 to controller 150. Controller 150 can then compare performance variables 160 with other data, e.g., temperature safety window 152, to further adjust engine system 110 as desired. In an embodiment, performance variables 160 can relate to temperature, and controller 150 can compute further instructions by comparing obtained temperature values with temperature safety window 152.

Figure 4:
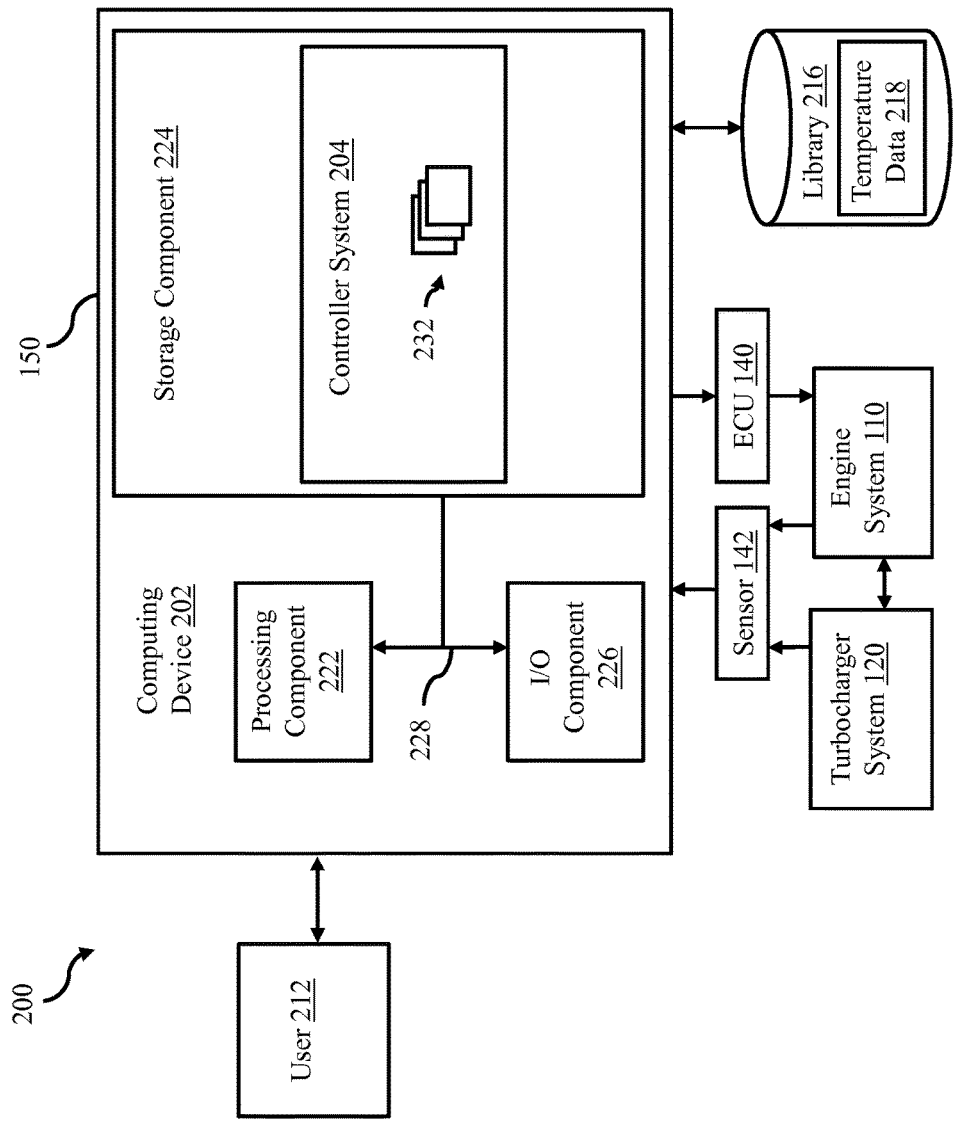
FIG. 4 shows an illustrative environment with a computing device coupled to an engine system and a turbocharger system according to an embodiment of the present disclosure.

Turning to FIG. 4, an illustrative environment 200, including controller 150, engine system 110, and gas turbine system 120, is shown. To this extent, environment 200 includes a computing device 202 that can perform a process described herein in order to adjust variables such as the speed of engine system 110 and the temperature of exhaust gas entering turbocharger system 120 during operation. In particular, computing device 202 can include a controller system 204, which allows computing device 202 to adjust components of engine system 110 by performing any/all of the processes described herein and implementing any/all of the embodiments described herein.

Engine system 110, turbocharger system 120 and at least one sensor 142, e.g., a temperature sensor, may be operably connected (e.g., via wireless, hardwire, or other conventional means) to computing device 202, such that computing device 202 may control aspects of ECU 140 in response to data obtained from sensor 142, as discussed herein. Although ECU 140 and controller 150 are shown by example as being distinct units, controller 150 and ECU 140 may be part of the same controller or control system. ECU 140 may, in turn, be operably connected to engine system 110, allowing computing device 202 to adjust the speed of engine system 110 to control the temperature of exhaust gas yielded to turbocharger system 120. As an example, ECU 140 may be coupled to throttle 134 (FIG. 2), which can be opened or closed to adjust the rate at which the air/fuel mixture from carburetor 130 (FIG. 2) enters engine system 110.

Figure 5:
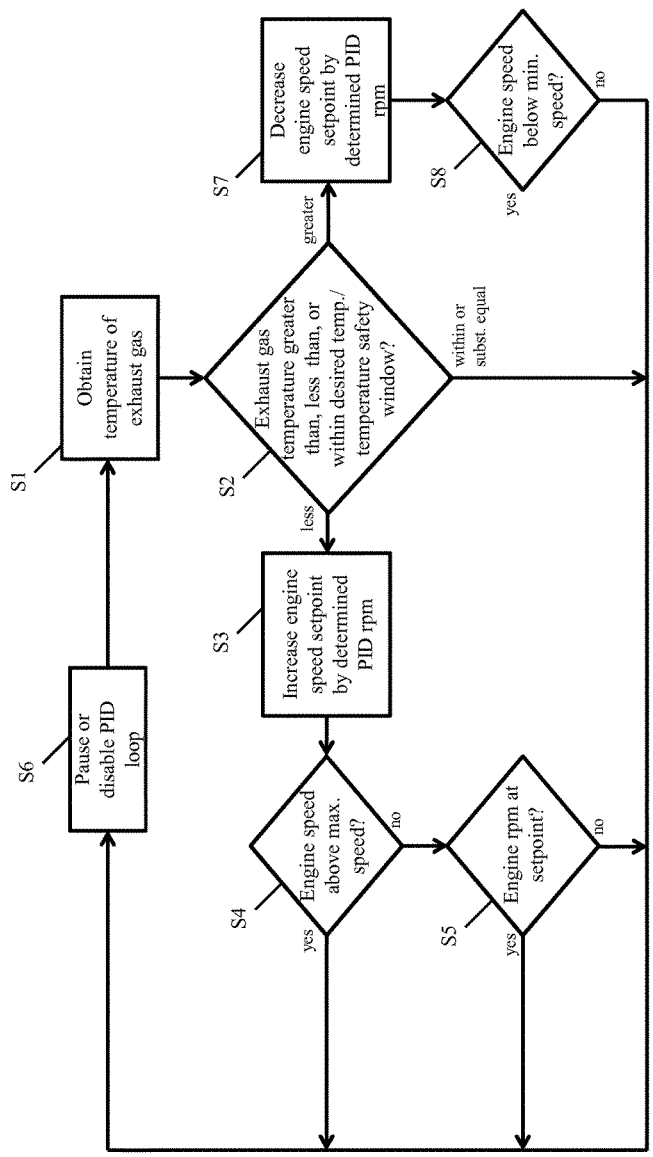
FIG. 5 shows a method flow diagram illustrating processes according to embodiments of the disclosure.

Computing device 202 may communicate with a library 216. In an embodiment, library 216 may include a predetermined temperature safety window or temperature set point for exhaust gases entering turbocharger system 120 from engine system 110. Specifically, the temperature safety window can be stored within the exhaust gas temperature optimization data 218 ("temperature data 218," hereafter) for gas turbine system 110. Temperature data 218 may include, e.g., an optimal or desired temperature (° C.) of exhaust gases entering turbine component 124 (FIGS. 1, 2) of turbocharger system 120. Although described by example herein as including "temperature data," it is understood that library 216 can also include other types of data pertaining to engine system 110 and turbocharger system 120, e.g., pressure data, chemical composition data, time data, etc., pertaining to engine system 110, turbocharger system 120, and/or other components and systems coupled thereto such as a gas compressor system. Controller system 204 can read temperature data 218 from library 216, and automatically adjust the speed of engine system 110 based on temperature data 218. One example method of adjusting engine system 110 with ECU 140 and controller 150, shown by example in FIG. 5, is through a PID (Product, Integral, Derivative) loop. A PID loop generally includes a process for adjusting an output variable by alternatively decreasing and increasing an input variable until a desired value or "setpoint" is reached. Embodiments of the present disclosure include controller 150 defining and/or adjusting an engine speed "setpoint" of engine system 110. ECU 140, can include a PID loop for adjusting the speed of engine system 110 in response to a user input, controller 150, and/or other factors. Specifically, ECU 140 can receive the adjusted setpoint from controller 150, and change the speed of engine system 110 as instructed by controller 150. Controller system 204 can adjust or define various setpoints in response to data obtained and steps performed in embodiments of the present disclosure.

As shown in FIG. 4 and described elsewhere herein, temperature data 218 can include a "safety window" of one or more exhaust gas temperatures, and/or desired maximum exhaust gas temperatures and speeds of engine system 110. Desired engine speeds can be defined, e.g., in revolutions per minute (rpm). The upper and lower limits of temperature safety window 152 (FIG. 3), desired maximum exhaust gas temperature 154 (FIG. 3), and/or desired maximum engine speed 156 (FIG. 3) may encompass a desired or optimum range of temperatures or other variables for the performance of engine system 110. More specifically, the temperature safety window 152 (FIG. 3), desired maximum exhaust gas temperature 154 (FIG. 3), and/or desired maximum engine speed 156 (FIG. 3) can include exhaust gas temperatures or other variables at which turbocharger system 120 and engine system 110 maintain a certain power output while resisting undesired effects, such as creep. For example, the desired maximum exhaust gas temperature 154 (FIG. 3) or the upper temperature limit of temperature safety window 152 (FIG. 3) can be a temperature at which turbocharger system 120 can operate safely. As an example, the upper temperature limit or target temperature can be, e.g., approximately 750° C. Above this temperature, turbocharger system 120 may be in danger of becoming broken or damaged after operating for a longer time. Desired maximum exhaust gas temperature 154 (FIG. 3) and/or an upper limit of temperature safety window 152 (FIG. 3) may be a temperature below which damage and/or malfunctions associated with excessively high temperatures are effectively prevented. In addition, temperature safety window 152 (FIG. 3) can also include a lower limit, which can prevent ECU 140 from sacrificing too much power output when reducing the speed of engine system 110 to accommodate high exhaust gas temperatures.

Temperature data 218 may be stored within library 216 as any conventional form of data. That is, temperature data 218 included in library 216 may define a mathematical relationship between the speed of engine system 110 and the temperature of exhaust gas entering turbocharger system 120, where the data may be represented or embodied in a variety of conventional data forms including, but not limited to, a look-up table, an algorithm, etc.

Computing device 202 is shown by example as including a processing component 222 (e.g., one or more processors), a storage component 224 (e.g., a storage hierarchy), an input/output (I/O) component 226 (e.g., one or more I/O interfaces and/or devices), and a communications pathway 228. In general, processing component 222 executes program code, such as the controller system 204, which is at least partially fixed in storage component 224. While executing program code, processing component 222 can process data, which can result in reading and/or writing transformed data from/to the storage component 224 and/or the I/O component 226 for further processing. Communications pathway 228 provides a communications link between each of the components in the computing device 202. The I/O component 226 can comprise one or more human I/O devices, which enable a human user 212 (e.g., an operator of engine system 110) to interact with the computing device 202 and/or one or more communications devices to enable a system user 212 to communicate with the computing device 202 using any type of communications link. To this extent, controller system 204 can manage a set of interfaces (e.g., graphical user interface(s), application program interface, etc.) that enable human and/or system users 212 to interact with controller system 204. Further, controller system 204 can manage (e.g., store, retrieve, create, manipulate, organize, present, etc.) data in storage component 224, such as determined engine speeds, detected exhaust gas temperatures, and temperature data 218 using any solution. More specifically, controller system 204 can store temperature data 218 in library 216 as described herein.

In any event, computing device 202 can comprise one or more general purpose computing articles of manufacture (e.g., computing devices) capable of executing program code, such as controller system 204, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the controller system 204 can be embodied as any combination of system software and/or application software.

Further, controller system 204 can be implemented using a set of modules 232. In this case, each module 232 can enable the computing device 202 to perform one or more tasks used by the controller system 204, and can be separately developed and/or implemented apart from other portions of the controller system 204. As used herein, the term "module" means program code that enables computing device 202 to implement the functionality described in conjunction therewith using any solution. For example, a "module" can include a comparator, a calculator, a timer, a data converter, etc. When fixed in a storage component 224 of computing device 202 that includes a processing component 222, each module 232 is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computing device 202.

For a computing device 202 made up of multiple computing devices, each of the multiple computing devices may have only a portion of controller system 204 fixed thereon (e.g., one or more modules 232). However, it is understood that computing device 202 and controller system 204 are only representative of various possible equivalent computer systems that may perform a process described herein. To this extent, in other embodiments, the functionality provided by computing device 202 and controller system 204 can be at least partially implemented by one or more computing devices that include any combination of general and/or specific purpose hardware with or without program code. In each embodiment, the hardware and program code, if included, can be created using standard engineering and programming techniques, respectively.

When computing device 202 includes multiple computing devices, the multiple computing devices can communicate over any type of communications link. Further, while performing a process described herein, computing device 202 can communicate with one or more other computer systems using any type of communications link. In either case, the communications link can comprise any combination of various types of wired and/or wireless links; comprise any combination of one or more types of networks; and/or use any combination of various types of transmission techniques and protocols.

Computing device 202 can obtain or provide data, such as temperature data 218, using any solution. For example, computing device 202 can obtain and/or retrieve temperature data 218 from sensor 142, one or more data stores, or another independent or dependent system. In some embodiments, computing device 202 can also send various pieces of data to other systems.

While shown and described herein as a system for controlling exhaust gas temperatures, it is understood that aspects of the invention further provide various alternative embodiments. For example, in one embodiment, the invention provides a computer program fixed in at least one computer-readable medium, which when executed, enables a computer system to control a temperature of exhaust gas yielded from engine system 110. To this extent, the computer-readable medium includes program code, such as controller system 204 (FIG. 3), which implements some or all of the processes and/or embodiments described herein. It is understood that the term "computer-readable storage medium" comprises one or more of any type of non-transitory or tangible medium of expression, now known or later developed, from which a copy of the program code can be perceived, reproduced, or otherwise communicated by a computing device. For example, the computer-readable storage medium can comprise: one or more portable storage articles of manufacture; one or more memory/storage components of a computing device; paper; etc.

In an embodiment, the invention provides a system for controlling the temperature of exhaust gas by adjusting the speed of engine component 110. In this case, a computer system, such as computing device 202, can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

Turning to FIG. 5, an example flow diagram illustrating processes according to embodiments of the invention is shown. The process flow diagram in FIG. 5 will be referred to in conjunction with FIGS. 2-3, and in particular, FIG. 4, which illustrates an environment 200 for performing the actions described with reference to the process flow of FIG. 5.

In step S1, modules 232 can read or obtain temperature data 218 pertaining to the temperature of an exhaust gas. The temperature data 218 obtained in step S1 can be stored, for example, in library 216, and may be the temperature of exhaust gas yielded from engine system 110 and provided to turbine component 124 of turbocharger system 120. One or more modules 232 with comparator functions can then compare the temperature of exhaust gas obtained in step S1 with a desired temperature and/or temperature safety window included with temperature data 218 and stored in environment 200, e.g., in library 216. Modules 232 with a comparator function can then determine in step S2 whether the exhaust gas is outside of (i.e., greater or less than) or within the temperature safety window, and/or substantially equal to the desired exhaust gas temperature.

Should the comparison in step S2 indicate that the exhaust gas temperature is less than the desired temperature and/or temperature safety window, modules 232 with calculating, controlling, and signaling functions can, in step S3, increase an engine speed "setpoint" value for a speed of engine system 110. As described elsewhere herein, a "setpoint" generally refers to the desired or target value of a particular variable. In embodiments of the present disclosure, the "setpoint" can refer to a desired speed of engine system 110. To adjust the speed of engine system 110, modules 232 with controlling and signaling functions can instruct ECU 140 to increase (in step S3) or decrease (in step S7) the engine speed setpoint. ECU 140 may contain an existing engine speed setpoint for the speed of engine system 110 (e.g., approximately 1000 rpm), and modules 232 can instruct ECU 140 to increase or decrease this value to adjust the speed of engine system 110. Thus, even if the 1000 rpm engine speed is provided to ECU 140 from a user, modules 232 of controller 150 can override the user's selected operational speed to accommodate increased exhaust gas temperatures. As described elsewhere herein, ECU 140 can adjust the operational speed of engine system 110 by opening or closing a throttle 134 positioned between engine system 110 and fuel supply 132.

Following the increasing of the engine speed setpoint in step S3, modules 232 with measuring, comparing, and determining functions can determine whether the operational speed of engine system 110 exceeds a maximum speed in step S4. The maximum speed may be stored, e.g., in library 216, and can define an upper limit of operational speeds in which engine system 110 is able to operate safely. Thus, the determining of step S4 can check whether controller 150 has caused ECU 140 to increase the operational speed of engine system 110 beyond its technical capabilities. As an example, the maximum speed used in step S4 can be determined by a user and may be, for example, approximately 1200 revolutions per minute (rpm) for some engine models. Where a comparing module 232 determines that the speed of engine system 110 is below the maximum speed, modules 232 can determine in step S5 whether the current operational speed of engine system 110 matches the engine speed setpoint provided to ECU 140.

After comparing the operational speed with the maximum speed and/or the setpoint, a module 232 with a disabling or control function can disable or pause the PID loop in step S6 in response to the engine speed exceeding its maximum speed or having an operational speed substantially equal to the engine speed setpoint. Any disabling of the PID loop in step S6 can be temporary or permanent. The PID loop can be permanently disabled in step S6 in a situation where the exhaust gas temperature is stable and within the temperature safety window or substantially equal to the desired temperature. A temporary disabling of the PID loop in step S6 can, for example, allow engine system 110 to operate at a constant speed over a set time before the PID loop is again enabled, to accommodate situations where the temperature of exhaust gas may increase at a later time. In the event that the PID loop is not disabled in step S6, or the temporary disabling of the PID loop ends, processes according to the present disclosure can briefly pause before returning to step S1, where modules 232 can obtain another temperature of the exhaust gas.

In the event that the comparison in step S2 indicates that the exhaust gas temperature is within the temperature safety window and/or substantially equal to the desired temperature, the process can immediately proceed to step S6, where the PID loop can pause or be disabled with modules 232. In this case, controller system 204 does not adjust the engine speed setpoint of ECU 140 because the exhaust gas temperature is not too high or too low. In addition, the process can return to step S1 to allow modules 232 to obtain further temperature data in step S1 to monitor whether the temperature of the exhaust gas has increased over time.

Where comparisons in step S2 indicate an exhaust gas temperature greater than the temperature safety window and/or the desired temperature, modules 232 with a calculator function and/or a controller function can decrease the engine speed setpoint value in response to the exhaust gas temperature being above the temperature safety window and/or desired temperature. Step S7 can include controller 150 communicating to ECU 140, where an existing engine speed setpoint value may have been stored or input. For example, controller 150 in step S7 can override a user's desired operational speed of engine system 110 by reducing the engine speed setpoint to a value where the exhaust gas from engine system 110 will not exceed the temperature safety window and/or desired temperature. Following the decrease of the engine speed setpoint in step S7, modules 232 with comparing and determining functions can evaluate whether the engine speed is below a minimum speed in step S8. In a contrast to the maximum speed of step S4, the minimum speed of step S8 is a speed below which engine system 110 would sacrifice significant power output for a minimal or insubstantial reduction of exhaust gas temperature. In some engine systems, the minimum speed of engine system 110 can be, e.g., approximately 900 revolutions per minute (rpm).

Where a module 232 determines in step S8 that the speed of engine system 110 is above the minimum speed, engine system 110 is efficiently compensating for the increased temperature of the exhaust gas. The process can then return to step S1 and repeat, allowing the power output of engine system 110 to gradually increase as the exhaust gas temperature is reduced. Before obtaining more exhaust gas temperatures, modules 232 determining an engine speed below the minimum speed can pause or disable the PID loop in step S6 to prevent the exhaust gas temperature from increasing even further above the temperature safety window and/or desired exhaust gas temperature.

Technical effects of the embodiments discussed herein include the ability to control exhaust gas temperature communicated from an engine system to a turbine component of a turbocharger system. In addition, embodiments of the present disclosure can prevent exhaust gas temperature communicated from an engine from exceeding a threshold temperature, temperature safety window, or similar quantity which may define, e.g., a temperature at which a turbocharger system or other component experiences creep effects or other forms of damage. Further, embodiments of the disclosure can adjust operational characteristics (e.g., exhaust gas temperature from an engine system) by increasing or decreasing the speed of the engine system.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for controlling an operational temperature of an exhaust gas, the system comprising:
    an engine having an operational speed when the engine is in operation;
    a turbocharger system including a turbine component, the exhaust gas being output from the engine in an exhaust line which is received at an input of the turbine component;
    a controller in communication with the engine; and
    a sensor disposed in the exhaust line being in communication with the controller, the sensor being configured to measure a first temperature and a second temperature of the exhaust gas disposed in the exhaust line;
    the system operating according to the following method:
        measuring the first temperature of the exhaust gas by the sensor,
        determining via the controller if the measured first temperature of the exhaust gas is less than a minimum temperature value or greater than a maximum temperature value, the minimum temperature value and maximum temperature values defining a temperature safety window of the system;
        calculating an engine speed of the engine via the controller;
        if the measured first temperature of the exhaust gas is determined to be less than the minimum temperature value of the temperature safety window or greater than the maximum temperature value of the temperature safety window, adjusting a first speed setpoint of the engine by the calculated engine speed via the controller to produce a second speed setpoint of the engine;
        changing the operational speed of the engine by the controller based on the second speed setpoint of the engine that results in the operational temperature of the exhaust gas in the exhaust line being altered so that when a second temperature of the exhaust gas is measured by the sensor at a later time period of operation of the system after the step of changing the operational speed, the measured second temperature of the exhaust gas is determined by the controller to be less than the maximum temperature value of the temperature safety window and greater than the minimum temperature value of the temperature safety window such that the operational temperature of the exhaust gas is controlled.

2. The system of claim 1, wherein the step of adjusting the first speed setpoint includes an adjustment to produce the second speed setpoint that is decreased from the first speed setpoint when the measured first temperature of the exhaust gas is determined to be greater than the maximum temperature value, and the step of adjusting the first speed setpoint includes an adjustment to produce the second speed setpoint that is increased from the first speed setpoint when the measured first temperature of the exhaust gas is determined to be less than the minimum temperature value.

3. The system of claim 1, wherein the calculated engine speed of the engine is calculated in a product, integral, derivative (PID) loop within the controller, is at least partially based on an input from a user of the engine, and is defined in revolutions per minute (RPM).

4. The system of claim 1, wherein the maximum temperature value of the temperature safety window is a maximum safe temperature within a temperature safety operating range of the turbocharger system.

5. The system of claim 1, wherein the temperature safety window includes a target exhaust gas temperature.

6. The system of claim 5, wherein the target exhaust gas temperature prevents creep-effects from occurring within the turbocharger system.

7. The system of claim 1, wherein the temperature safety window is based on an operational characteristic of the engine.

8. The system of claim 7, wherein the operational characteristic of the engine system includes one of an engine size, a maximum power output, an engine model, and a fuel supply of the engine.

9. A program product stored on a computer readable storage medium, the program product operative to control an operational temperature of an exhaust gas yielded from an engine system to a turbocharger system when executed, the exhaust gas being output from the engine in an exhaust line which is received at an input of a turbine component of the turbocharger system, the computer readable storage medium comprising program code for:
reading the temperature of the exhaust gas from a temperature sensor positioned within the turbocharger system;
determining if the measured first temperature of the exhaust gas is less than a minimum temperature value or greater than a maximum temperature value, the minimum temperature value and maximum temperature values defining a temperature safety window of the system;
calculating an engine speed of an engine of the engine system;
if the measured first temperature of the exhaust gas is determined to be less than the minimum temperature value of the temperature safety window or greater than the maximum temperature value of the temperature safety window, adjusting a first speed setpoint of the engine by the calculated engine speed to produce a second speed setpoint of the engine;
changing the operational speed of the engine by based on the second speed setpoint of the engine that results in the operational temperature of the exhaust gas in the exhaust line being altered so that when a second temperature of the exhaust gas is measured by the sensor at a later time period of operation of the system after the step of changing the operational speed, the measured second temperature of the exhaust gas is determined to be less than the maximum temperature value of the temperature safety window and greater than the minimum temperature value of the temperature safety window such that the operational temperature of the exhaust gas is controlled.

10. The program product of claim 9, wherein the step of adjusting the first speed setpoint includes an adjustment to produce the second speed setpoint that is decreased from the first speed setpoint when the measured first temperature of the exhaust gas is determined to be greater than the maximum temperature value, and the step of adjusting the first speed setpoint includes an adjustment to produce the second speed setpoint that is increased from the first speed setpoint when the measured first temperature of the exhaust gas is determined to be less than the minimum temperature value.

11. The program product of claim 9, wherein the calculated engine speed of the engine is calculated in a product, integral, derivative (PID) loop, is at least partially based on an input from a user of the engine, and is defined in revolutions per minute (RPM).

12. The program product of claim 9, wherein the maximum temperature value of the temperature safety window is a maximum safe temperature within a temperature safety operating range of the turbocharger system.

13. The program product of claim 9, wherein the changing of the operational speed of the engine includes one of opening or closing a throttle of the engine system.

14. The program product of claim 9, wherein the temperature safety window is based a composition of fuel used in the engine system.

15. A system comprising:
an engine system;
a turbocharger system in fluid communication with the engine system, the turbocharger system including:
a turbine component configured to receive an exhaust gas from the engine system, the exhaust gas being output from the engine system in an exhaust line which is received at an input of the turbine component;
a rotatable shaft coupled to the turbine component;
a compressor component coupled to the rotatable shaft, wherein the compressor component is configured to deliver a compressed air stream to the engine system;
a controller configured to adjust an engine system speed based on the temperature of the exhaust gas being outside of a temperature safety window; and
a sensor disposed in the exhaust line being in communication with the controller, the sensor being configured to measure a first temperature and a second temperature of the exhaust gas disposed in the exhaust line;
the system operating according to the following method:
measuring the first temperature of the exhaust gas by the sensor,
determining via the controller if the measured first temperature of the exhaust gas is less than a minimum temperature value or greater than a maximum temperature value, the minimum temperature value and maximum temperature values defining a temperature safety window of the system;

calculating an engine speed of the engine system via the controller;

if the measured first temperature of the exhaust gas is determined to be less than the minimum temperature value of the temperature safety window or greater than the maximum temperature value of the temperature safety window, adjusting a first speed setpoint of the engine system by the calculated engine speed via the controller to produce a second speed setpoint of the engine system;

changing the operational speed of the engine system by the controller based on the second speed setpoint of the engine system that results in the operational temperature of the exhaust gas in the exhaust line being altered so that when a second temperature of the exhaust gas is measured by the sensor at a later time period of operation of the system after the step of changing the operational speed, the measured second temperature of the exhaust gas is determined by the controller to be less than the maximum temperature value of the temperature safety window and greater than the minimum temperature value of the temperature safety window such that the operational temperature of the exhaust gas is controlled.

16. The system of claim 15, wherein the engine system comprises an internal combustion engine configured to react a fuel supply with the compressed air stream to yield the exhaust gas.

17. The system of claim 15, wherein the step of adjusting the first speed setpoint includes an adjustment to produce the second speed setpoint that is decreased from the first speed setpoint when the measured first temperature of the exhaust gas is determined to be greater than the maximum temperature value, and the step of adjusting the first speed setpoint includes an adjustment to produce the second speed setpoint that is increased from the first speed setpoint when the measured first temperature of the exhaust gas is determined to be less than the minimum temperature value.

18. The system of claim 15, wherein the calculated engine speed of the engine system is calculated in a product, integral, derivative (PID) loop within the controller, is at least partially based on an input from a user of the engine system, and is defined in revolutions per minute (RPM).

19. The system of claim 15, wherein the maximum temperature value of the temperature safety window is a maximum safe temperature within a temperature safety operating range of the turbocharger system.

* * * * *